US00RE45769E

(19) United States
(12) Reissued Patent
Varone et al.

(10) Patent Number: US RE45,769 E
(45) Date of Reissued Patent: Oct. 20, 2015

(54) INTEGRATED CIRCUIT BOARD WITH WIRELESS CIRCUITRY

(71) Applicant: STMICROELECTRONICS INTERNATIONAL N.V., Amsterdam (NL)

(72) Inventors: Francesco Varone, Bellona (IT); Amedeo Veneroso, Caserta (IT)

(73) Assignee: STMICROELECTRONICS INTERNATIONAL N.V., Geneva (CH)

(21) Appl. No.: 14/222,900

(22) Filed: Mar. 24, 2014

Related U.S. Patent Documents

Reissue of:
(64) Patent No.: 8,165,636
Issued: Apr. 24, 2012
Appl. No.: 12/414,850
Filed: Mar. 31, 2009

(30) Foreign Application Priority Data

Mar. 31, 2008 (IT) ..... MI2008A0550

(51) Int. Cl.
*H04M 1/00* (2006.01)
*G06Q 20/34* (2012.01)
*G06F 9/445* (2006.01)

(52) U.S. Cl.
CPC ..... *G06Q 20/341* (2013.01); *G06F 9/445* (2013.01)

(58) Field of Classification Search
USPC ..... 455/558, 518, 566; 715/762, 771; 710/9; 707/781; 719/314
See application file for complete search history.

(56) References Cited

U.S. PATENT DOCUMENTS

| | | | | |
|---|---|---|---|---|
| 8,046,778 | B1 * | 10/2011 | Getlin et al. | 719/328 |
| 2005/0119940 | A1 | 6/2005 | Concilio et al. | 705/18 |
| 2005/0193098 | A1 * | 9/2005 | Khandpur et al. | 709/220 |
| 2007/0130292 | A1 * | 6/2007 | Tzruya et al. | 709/219 |

FOREIGN PATENT DOCUMENTS

| | | |
|---|---|---|
| EP | 1717723 | 11/2006 |
| EP | 1895743 | 3/2008 |
| WO | 98/29830 | 7/1998 |
| WO | 2005/053220 | 5/2006 |
| WO | 2006/045344 | 5/2006 |
| WO | 2006/056220 | 5/2006 |
| WO | 2006/056220 | 6/2006 |

* cited by examiner

*Primary Examiner* — Mark Sager
(74) *Attorney, Agent, or Firm* — Allen, Dyer, Doppelt, Milbrath & Gilchrist, P.A.

(57) ABSTRACT

An IC Card comprises a first device, including a first processor and a first memory unit, to communicate with a handset, and a second device. The second device includes a second processor and a second memory unit, to communicate via a wireless communication with an electronic apparatus external to the handset, the second device providing predetermined services. Each predetermined service is programmed to receive a wireless message from a respective electronic apparatus, to execute a predetermined [elaboration] *operation*, and to return a result to the respective electronic apparatus. The second memory unit stores a plurality of additional programs for executing additional [elaborations] *operations*, each program being associated to one of the predetermined services. The second device has a run-time environment for executing the additional programs when the corresponding predetermined services receives the wireless message.

20 Claims, 3 Drawing Sheets

INTEGRATED CIRCUIT BOARD WITH WIRELESS CIRCUITRY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention is related to the field of IC Cards, and, more particularly, to an IC Card for communicating with a wireless device.

BACKGROUND OF THE INVENTION

An IC Card comprises a first device including a first processor and a first memory unit, intended to communicate with a handset, for example a mobile telephone. The IC Card is substantially enclosed inside the handset and electrically connected to it via contact pads.

A communication between the handset and the IC Card generally complies with an ISO 7816 protocol wherein the handset sends commands to the IC Card and the IC Card responds to such commands as a slave device. The IC Card may also comprise a second device, including a second processor and a second memory unit intended to communicate with an electronic apparatus.

The IC Card 1 of FIG. 1 comprises a first device 2, intended to communicate in conventional way with a handset 9, and a second device 3, intended to communicate with an electronic apparatus 10. The electronic apparatus 10 is substantially external to the handset device 9 and in wireless communication with the second device 3. More particularly, the IC Card 1 comprises an antenna 4, connected-to or included-in the second device 3, for receiving and transmitting wireless messages from/to the electronic apparatus 10.

The second device 3 emits conventional messages at predetermined intervals, representing the profile of the second device 3. In other words, the profile of the second device 3 specifies the wireless messages that it is able to receive. The electronic apparatus 10 in proximity of the handset device 9, detects a conventional message emitted by the second device 3 and responds to it with a wireless message.

When the antenna 4 receives the wireless message from the electronic apparatus 10, the wireless message is processed by the second device 3 and a result is returned to the electronic apparatus 10. The profile of the second device 3 may be programmed to receive wireless messages from different electronic apparatuses. In this case, the second device 3 may receive different wireless messages from different electronic apparatuses 10 and process a specific result, depending on the wireless messages received.

More particularly, the second device 3 provides one or more predetermined services 3a, 3b, 3c, also indicated in FIG. 3 as endpoint applications, intended to receive wireless message from different and respective electronic apparatuses 10 and to process the specific results.

When the electronic apparatus 10 sends the wireless message to the antenna 4, the corresponding predetermined service, for example the predetermined service 3a, executes a predetermined [elaboration] *operation* and returns a result to the electronic apparatus 10. The wireless communication may for example be based on the ZigBee protocol; in this case, the second device and the electronic apparatus are ZigBee nodes.

A drawback of such IC Card 1 is that a long delay may occurs between the time in which the IC Card receives the wireless message and the time in which the IC Card 1 may perform a consequential operation, e.g. return the result to the corresponding electronic apparatus 10.

This drawback is schematically explained with reference to FIG. 1.

The external apparatus 10 sends the wireless message, indicated as remote request, to the second device 3 of the IC Card 1. In order to process the wireless message, a software module indicated as ZigBee Engine is executed. As schematically represented in FIG. 2, the ZigBee Engine is stored inside the first device 2 and provides additional API for the execution of the predetermined services 3a, 3b, 3c and for managing a communication between the first device 2 and the second device 3.

When the wireless message is received by the second device 3, the first device 2 may be not ready to execute the ZigBee Engine, since it is a slave device with respect to the handset device 9 and must wait for an APDU command from the handset device 9, in order to execute the ZigBee Engine.

Such a drawback heavily penalizes the wireless communication between the second device 3 and the electronic apparatus 10, since the electronic apparatus 10 cannot receive the result of the [elaboration] *operation* rapidly but it must wait for the execution of the ZigBee Engine. In other words the IC Card 1 cannot be used with electronic apparatuses 10 requiring a result in a few time. This is not helpful in case of protocols based on fast exchanges of small messages, such as handshake procedures.

More particularly, according to the ISO 7816 protocol, the handset device 9 executes a poll operation towards the first device 2 of the IC Card 1, in order to detect a status of the first device 2. The first device 2 sends a poll message to the second device 3. Since the second device 3 has received a wireless message it returns the wireless message to the first device 2.

The ZigBee Engine is executed to process the wireless message, a reply message is forwarded to the second device 3 and the result is delivered to the electronic apparatus 10 via a wireless communication. The delay due to the operations described above is schematically shown in FIG. 1 as "effective response delay".

Moreover, the ZigBee Engine is generally programmed to recall specific applets, also indicated as ZigBee Applet 2a, 2b, 2c and stored inside the memory unit of the first device 2, for executing the predetermined services 3a, 3b, 3c. Each ZigBee Applet 2a, 2b, 2c is generally provided to manage a corresponding predetermined service 3a, 3b, 3c. So the delay for returning the result to the electronic apparatus 10 is also due to the execution of the ZigBee Applet 2a, 2b, 2c, as schematically represented in FIG. 2.

Such IC Card 1 suffers for another issue due to the fact that the predetermined services 3a, 3b, 3c provides predetermined [elaborations] *operations* depending on the hardware design of the second device 3. In order to modify the predetermined services 3a, 3b, 3c, for example for processing an [elaboration] *operation* different from the predetermined one, the hardware of the second device 3 may helpfully be modified.

SUMMARY OF THE INVENTION

The present invention provides an IC Card able to communicate with a handset and, additionally, in wireless mode with one or more electronic apparatuses, the IC Card being able to receive wireless messages from the electronic apparatuses, to execute a predetermined [elaboration] *operation* as soon as the wireless message is received and to return a result to the electronic apparatus as soon as the result is processed, without introducing delay due to the communication between the handset and the IC Card, the IC Card being also easily configurable to modify the [elaboration] *operation* to be executed, avoiding hardware modification of the second device.

The present disclosure provides an IC Card including a first device intended to communicate with a handset and a second device intended to execute predetermined [elaborations] *operations* for an electronic apparatus, the second device further including a plurality of additional programs for providing additional [elaborations] *operations*, such additional programs being executed without waiting a communication between the first device and the handset.

An IC Card comprises a first device, including a first processor and a first memory unit, intended to communicate with a handset, and a second device, including a second processor and a second memory unit, intended to communicate via a wireless communication with at least an electronic apparatus external to the handset, the second device providing predetermined services. Each predetermined service is programmed to receive a wireless message from a respective electronic apparatus, to execute a predetermined [elaboration] *operation* and to return a result to the respective electronic apparatus. The second memory unit stores a plurality of additional programs for executing additional [elaborations] *operations*, each program being associated to one of predetermined service. The second device comprises a run-time environment for executing the additional programs when the corresponding predetermined services receives the wireless message.

Another aspect is directed to a method for executing at least an additional program in the IC Card.

Advantageously, additional [elaborations] *operations* may be executed by the second device without modifying the hardware of the second device and without modifying the wireless communication between the second device and the electronic apparatuses, since the execution of the additional programs is activated by the predetermined services.

Moreover, the additional programs may be modified easily and post issuance in order to modify the additional [elaboration] *operation* and the corresponding results returned from the second device to the electronic apparatuses. Advantageously, the run-time environment of the second device provides that the execution of the additional [elaboration] *operation* and the corresponding result may be returned to the electronic apparatuses without introducing long latencies due to the communication between the handset and the first device.

These and other advantages will be apparent from the following description and from the annexed drawings given only for exemplificative purpose and without limiting the scope of protection of the appended claims.

DETAILED DESCRIPTION OF THE PREFERRED EMBODIMENTS

Figure 1:
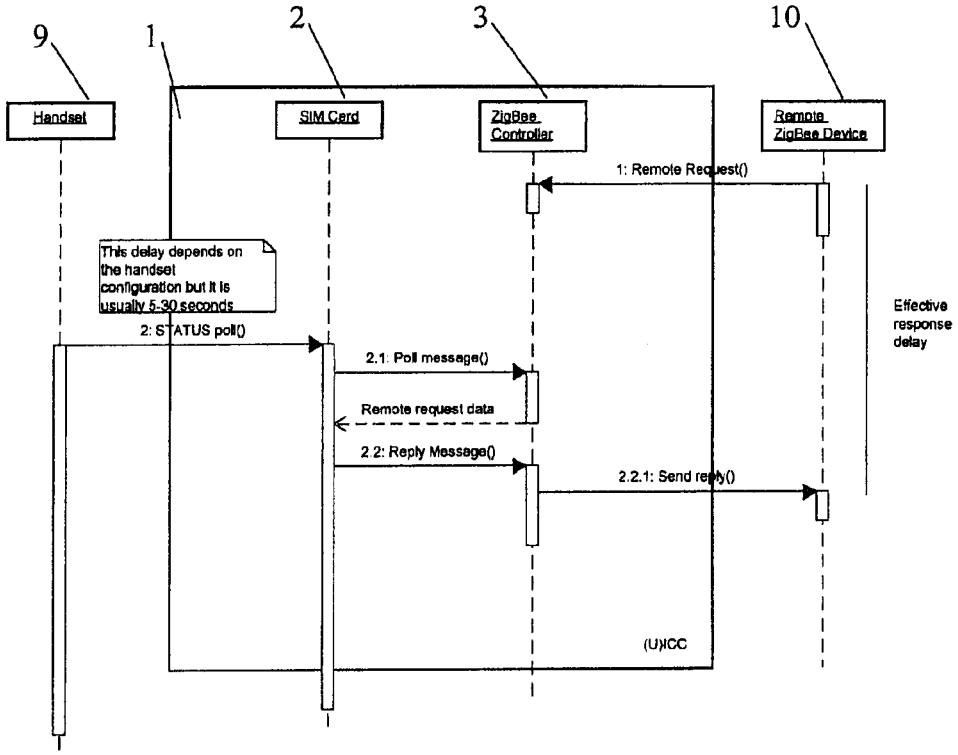
Fig. 1 (PRIOR ART)
FIG. 1 schematically shows a first communication between a first device of an IC Card and a handset and a second communication between a second device of the IC Card and an electronic apparatus, according to the prior art.
Figure 2:
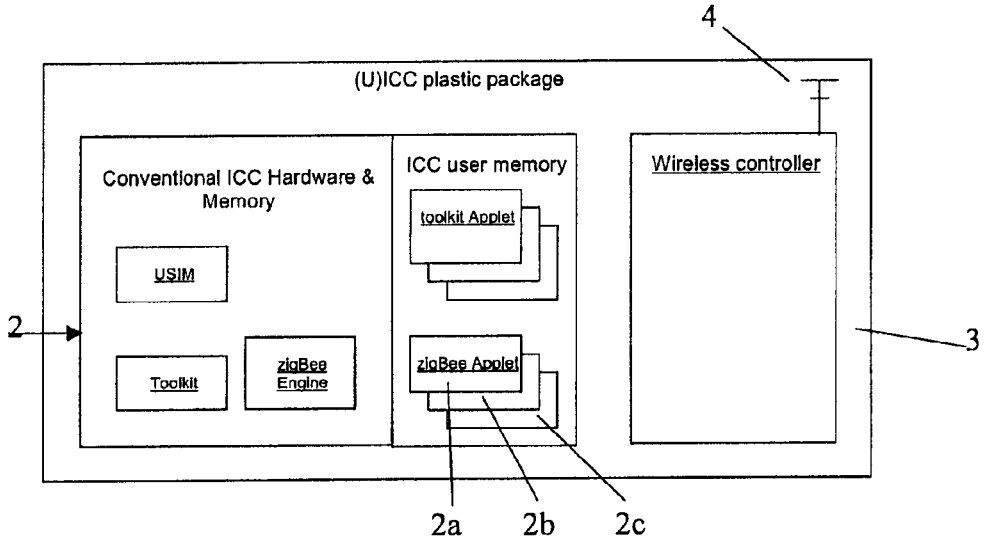
Fig. 2 (PRIOR ART)
FIG. 2 schematically shows an hardware configuration of the first and second device of the IC Card of FIG. 1, according to the prior art.

With reference to the annexed drawings an IC Card is schematically represented and globally indicated with numeral reference 1. The IC Card 1 comprises a first device 2 including a first processor $\mu_1$ and a first memory unit $M_1$, intended to communicate in conventional way with a handset 9, according to the ISO 7816 protocol.

The IC Card 1 also comprises a second device 3, including a second processor $\mu_2$ and a second memory unit $M_2$, intended to communicate with an electronic apparatus 10, substantially external to the handset device 9, in wireless communication with the second device 3.

The IC Card 1 comprises an antenna 4 for receiving and transmitting wireless messages from/to the electronic apparatus 10. The wireless message is processed by the second device 3 and a result is returned to the electronic apparatus 10.

Figure 3:
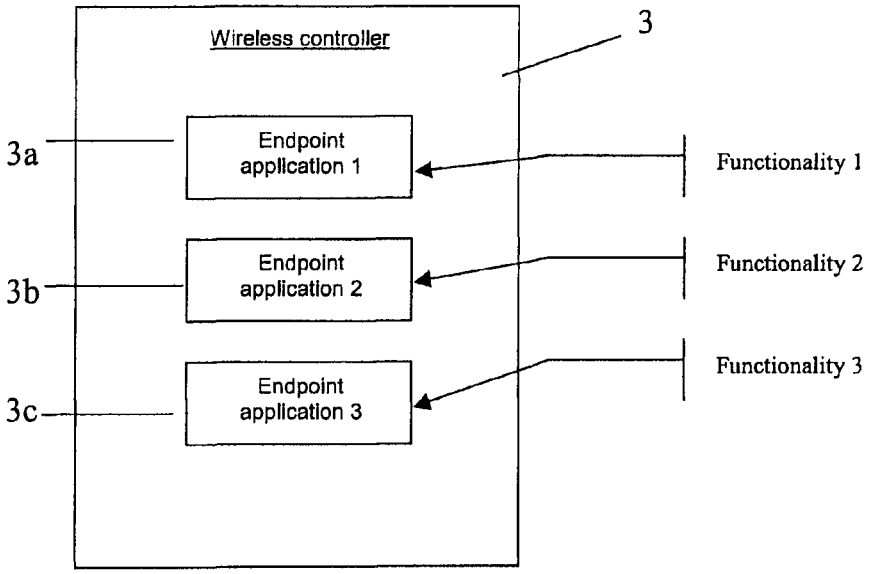
Fig. 3 (PRIOR ART)
FIG. 3 schematically shows a plurality of predetermined services provided by the second device of FIG. 2, according to the prior art.
Figure 4:
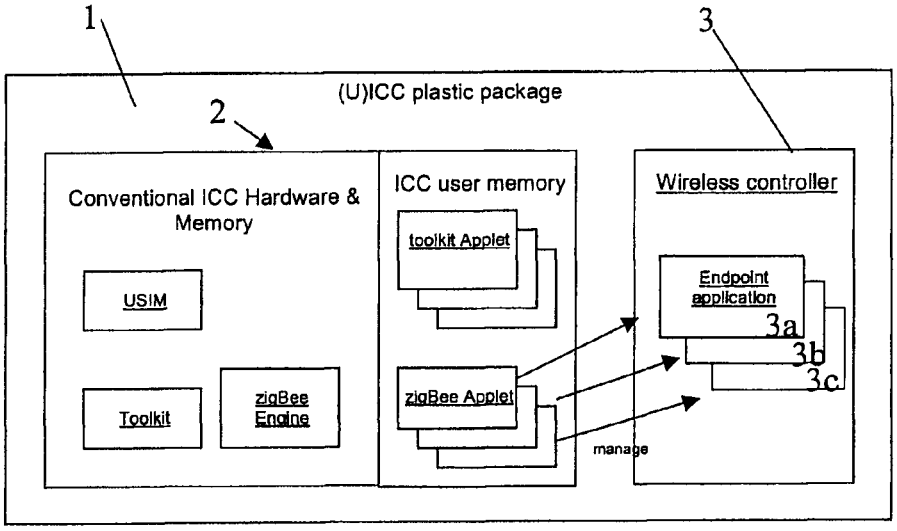
Fig. 4 (PRIOR ART)
FIG. 4 schematically shows a communication between the predetermined services of FIG. 2 and corresponding applets included in the first device of FIG. 2.
Figure 5:
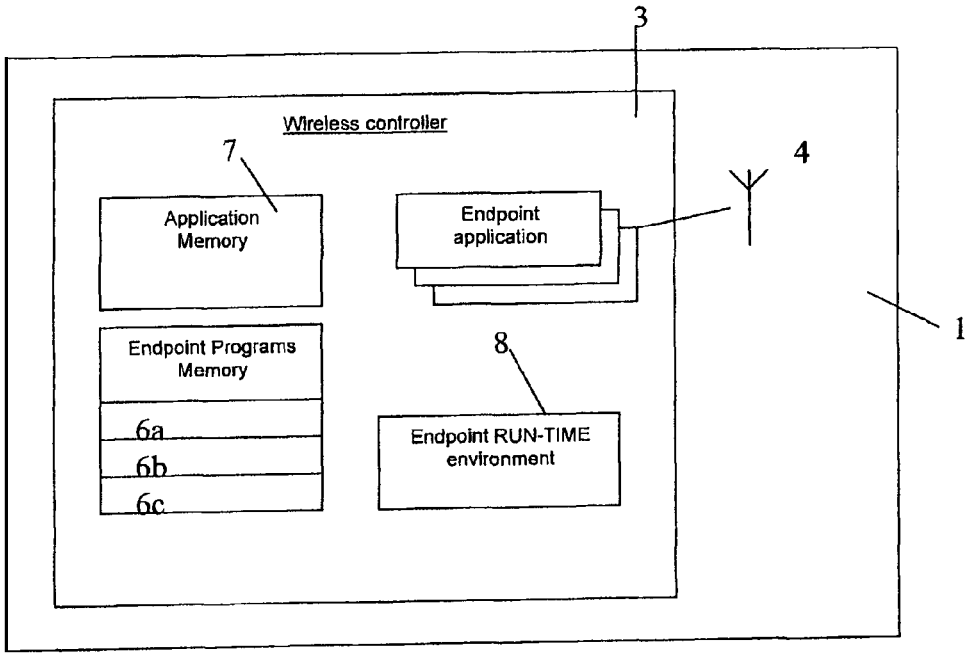
FIG. 5 schematically shows an IC Card a second device, according to the present invention.
Figure 6:
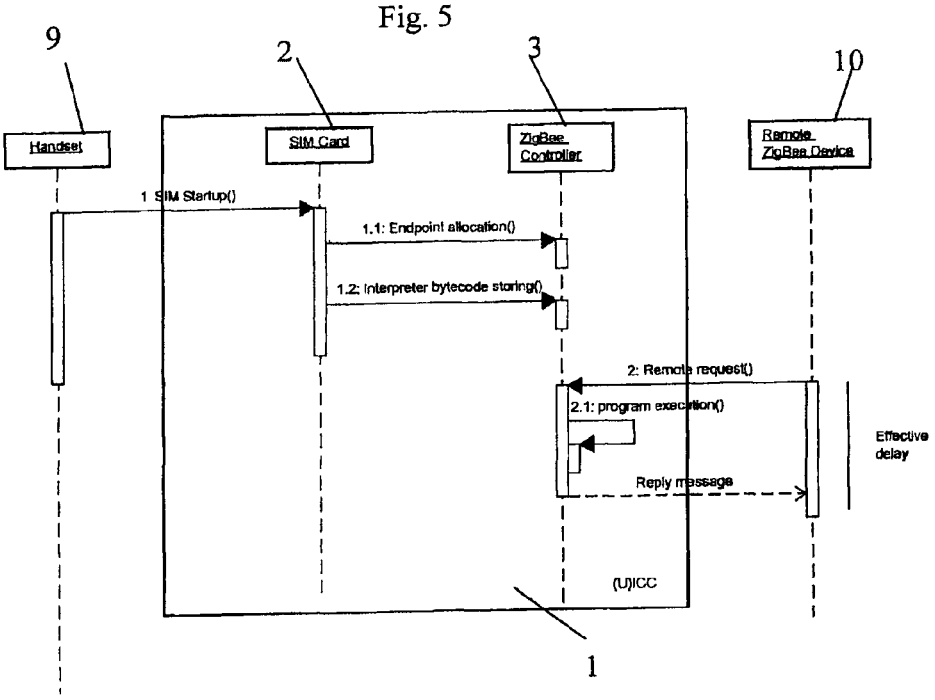
FIG. 6 schematically shows a second communication between the second device of the IC Card of FIG. 5 and an electronic apparatus, according to the present invention.

More particularly, as schematically represented in FIG. 3, the second device 3 provides one or more predetermined services 3a, 3b, 3c, intended to receive wireless messages from different and respective electronic apparatuses 10 and to process specific results.

When the electronic apparatus 10 sends the wireless message to the antenna 4, the corresponding predetermined service 3a, 3b, 3c executes a predetermined [elaboration] *operation*. The wireless communication is for example based on the ZigBee specification.

The second memory unit $M_2$ stores a plurality of additional programs 6a, 6b, 6c for executing additional [elaborations] *operations*. Each program 6a, 6b, 6c is associated to one of the predetermined services 3a, 3b, 3c so that the second device 3 may return to the electronic apparatus 10 a result not provided by the predetermined [elaboration] *operation*.

More particularly, the second device 3 comprises a run-time environment for executing the additional programs 6a, 6b, 6c as soon as the corresponding predetermined services 3a, 3b, 3c receives the wireless message from the electronic apparatus. A plurality of applets, stored in the first device 2 and also indicated as ZigBee Applets, have the capabilities, provided by dedicated APIs, of associating the additional programs 6a, 6b, 6c to the predetermined services 3a, 3b, 3c, ZigBee Applet. The ZigBee Applets are executed when particular events occur, e.g. at start-up of the IC Card 1, for associating the additional programs 6a, 6b, 6c to the corresponding predetermined services 3a, 3b, 3c.

When a predetermined service 3a, 3b, 3c receives a wireless message from an electronic device, it executes immediately the corresponding additional program 6a, 6b, 6c through the run-time environment; the additional program 6a, 6b, 6c process the results that can be immediately returned to the electronic apparatuses 10.

According to the IC Card 1 of the present invention, when the additional programs 6a, 6b, 6c are associated to the predetermined programs 3a, 3b, 3c, the additional programs 6a, 6b, 6c may process a result and result it to the electronic device 10 without waiting for the execution of operations inside the first device 2.

More particularly, the run-time environment comprises, but it is not limited to, the following operations:

- sending a reply message from the second device 3 to the electrical apparatus 10;
- forwarding data included in a wireless message received by the electronic apparatus 10 to a ZigBee Applet;
- sending a generic message to the ZigBee Applet;
- executing cryptographic operations;
- executing arithmetic or logic operations;
- executing an analysis on the wireless message received;
- executing control flow operations.

More particularly, the second memory unit M2 comprises a storage area wherein data associated to an execution of the additional programs 6a, 6b, 6c are stored, for example cryptographic keys, text, variables. The data stored in the storage area may be read or written by the predetermined services 3a, 3b, 3c as well as by the additional programs 6a, 6b, 6c, during their execution.

For example, the variables are stored in a portion of volatile memory or in a portion of non volatile memory of the second memory unit M2. More particularly, variables stored in different portions may be referred by the same name, since each additional program 6a, 6b, 6c refers only to the portion associated to the respective predetermined service 3a, 3b, 3c.

The ZigBee Applet may be provided by specific commands to access the second memory unit M2. For example this command may be based on additional API provided by the ZigBee Engine of the IC Card 1.

One aspect is directed to a method for downloading the additional programs 6a, 6b, 6c in the second device 3. More particularly, the method provides the downloading of the additional programs 6a, 6b, 6c in different ways.

According to a first embodiment, a specific service of the predetermined service 3a, 3b, 3c may be stored inside the second device 3 for receiving the additional programs 6a, 6b, 6c from the electronic apparatus 10. In this case a specific electronic apparatus is provided for communicating with the second device 3 and downloading the predetermined service 3a, 3b, 3c.

According to a second embodiment, one or more ZigBee Applets stored in the first device 2 provides the download of the additional programs 6a, 6b, 6c. For example the first device 2 may receive a specific SMS including an additional program to be stored. When the specific SMS message is received, the first device 2 activates a specific ZigBee Applet. The ZigBee Applet accesses the second memory unit M2 of the second device 3 and stores the program in the second memory unit M2. The special SMS may be formatted and provided with security controls, for example according to the standard ETSI TS 102 225.

According to a third embodiment, each additional program 6a, 6b, 6c is downloaded by a corresponding ZigBee Applet. In this case, for each predetermined service 3a, 3b, 3c, a corresponding ZigBee Applet is provided. The ZigBee Applet controls the execution of the predetermined service 3a, 3b, 3c and may update the additional program 6a, 6b, 6c associated to the predetermined service 3a, 3b, 3c.

Hereinafter the main features of the IC Card are resumed. The IC Card 1 comprises a first device 2, including a first processor $\mu_1$ and a first memory unit $M_1$, intended to communicate in conventional way with a handset 9, and a second device 3, including a second processor $\mu$2 and a second memory unit $M_2$, intended to communicate via a wireless communication with at least an electronic apparatus 10 external to the handset 9.

The second device 3 provides predetermined services 3a, 3b, 3c, each predetermined service 3a, 3b, 3c being programmed to receive a wireless message from a respective electronic apparatus 10, to execute a predetermined [elaboration] *operation* on the base of the wireless message received and to return a result to the respective electronic apparatus 10.

The second memory unit $M_2$ stores a plurality of additional programs 6a, 6b, 6c for executing additional [elaborations] *operations*, each program 6a, 6b, 6c being associated to one of the predetermined services 3a, 3b, 3c. The second device 3 comprises a run-time environment for executing the additional programs 6a, 6b, 6c when the associated predetermined services 3a, 3b, 3c receive the wireless message.

The first device 2 includes at least an applet, also indicated as ZigBee Applet, for associating the additional programs (6a, 6b, 6c) to the corresponding predetermined services (3a, 3b, 3c). The second device 3 is a ZigBee node and the wireless communication between the second device 3 and the electronic apparatus comply with a ZigBee specification.

The first processor $\mu_1$ comprises additional APIs for supporting a communication between the ZigBee Applets and the second device 3.

Hereinafter the main features of the method for executing at least an additional program in an IC Card are resumed. The additional program (6a, 6b, 6c) are by an IC Card 1 comprising a first device 2 intended to communicate in conventional way with a handset 9 and a second device 3 intended to communicate via a wireless communication with at least an electronic apparatus 10 external to the handset 9. The second device 3 provides predetermined services 3a, 3b, 3c associated to the additional programs 6a, 6b, 6c and programmed to receive a wireless message from a respective electronic apparatus 10.

The additional programs 6a, 6b, 6c are executed by a run-time environment of the second device 3 when the corresponding predetermined services 3a, 3b, 3c receives the wireless message. According to a first embodiment of the method, the additional programs 6a, 6b, 6c are downloaded in a second memory unit M2 of the second device 3 by an applet, also indicated as ZigBee Applet, of the first device 2.

According to a second embodiment of the method, the additional programs 6a, 6b, 6c are downloaded in the second memory unit M2 of the second device 3 by a specific predetermined service 3a, 3b, 3c, programmed to receive the additional programs (6a, 6b, 6c) from a corresponding specific electronic apparatus 10.

According to a third embodiment of the method, the additional programs 6a, 6b, 6c are downloaded in the second memory unit M2 of the second device 3 by an applet, also indicated as ZigBee Applet, programmed to receive a specific SMS that includes the additional programs 6a, 6b, 6c to be downloaded.

The additional programs 6a, 6b, 6c are associated to the predetermined services 3a, 3b, 3c by an applet or ZigBee Applet. Advantageously, the IC Card 1 allows the reduction of the response time required by the second device 3 to return a result to the electronic apparatus 10 and to perform any consequential operation.

As already stated, without the additional programs 6a, 6b, 6c and the run-time environment, the response time of the second device 3 towards the electronic device 10 would depend on the applets or ZigBee Applets execution inside the first device 2. In fact, according to the SIM Application Toolkit applets, the ZigBee Applet are executed only from time to time, when the handset 9 activates the first device 2. However the activation of the IC Card 1 may not occur continuously and long time may occur between the receipt of a wireless message from the second device 3 and the activation of the first device 2. So the processing of the result to be sent from the second device 3 towards to the electronic apparatus 10 would be delayed.

Advantageously, the present disclosure, taking advantage of the fact that the second device 3 is active and listening to incoming wireless messages from the electronic apparatus 10, is able to process the wireless messages independently and autonomously with respect to the first device 2 and handset 9. This reduces the delay for executing requests from the electronic apparatuses 10, achieving a consistent benefit in real time applications.

The advantage is also greater when the second device 3 communicates with a remote device via the electronic apparatus 10 since data send-to and received-from the remote device are not delayed by the execution of a ZigBee Applet. A further advantage is based on the fact that a computational load may be balanced among the second device 3 and the first device 2, allowing more efficient executions.

Moreover, the behavior of the second device 3, in other words the [elaboration] *operation* provided by the second device 3 on the receipt of a wireless message from an electronic device 10, may be updated in simple way by modifying, even remotely, the additional program 6a, 6b, 6c and avoiding any hardware change.

The IC Card 1 achieves great advantages also with respect to a handset 9 provided with wireless communication, for example Bluetooth, and with programmable computation, for example Symbian o J2ME.

In fact, the Bluetooth/Symbian-J2ME handset 9 is an expensive device while the IC Card 1 provided with a second device 3 and the corresponding wireless communication is a cheap device and it may be used with a handset 9.

Moreover, since the IC Card 1 is provided with secured means and with a user profile, the additional [elaborations] *operations* may be associated to the identity of the used and/or they may be protected by cryptographic operations, providing a secure communications and results to the electronic apparatuses 10.

That which is claimed is:

1. An IC Card comprising:

a first device comprising a first processor and a first memory coupled thereto, said first device configured to communicate with a mobile wireless communications device; and a second device comprising a second processor and a second memory unit coupled thereto, said second device configured to communicate wirelessly with at least one other mobile wireless communications device;

said second device configured to provide services, each service to receive a wireless message from the at least one other mobile wireless communications device;

said second device also configured to execute an [elaboration] *operation* and to return a result to the at least one other mobile wireless communications device *while waiting for execution of operations by the first device*;

said second memory configured to store a plurality of programs for executing additional [elaborations] *operations*, each program being associated with a service;

said second device further comprising a run-time environment configured to execute the programs when a corresponding service receives the wireless message *without waiting for execution of the operations by the first device*.

2. An IC Card according to claim 1, wherein said first memory is also configured to store an applet for associating the plurality of programs with respective services.

3. An IC Card according to claim 2, wherein said first processor and said first memory are configured to provide at least one application programming interface (API) for communication between the applet and said second processor and said second memory.

4. An IC Card comprising:

an IC card substrate;

a first processor and a first memory cooperating therewith and carried by said IC Card substrate and configured to communicate with a mobile wireless communications device;

a second processor, a second memory, and a wireless transceiver cooperating together and configured to provide a plurality of services and for wireless communication with at least one other mobile wireless communications device;

each service configured to receive a wireless message from said at least one other mobile wireless communications device, to execute an [elaboration] *operation*, and to return an [elaboration] *operation* result to said at least one other mobile wireless communications device *while waiting for execution of operations by the first processor*;

said second memory configured to store and said second processor configured to execute a plurality of additional programs for performing additional [elaborations] *operations*, each additional program being associated with a respective service;

said second processor and said second memory configured to provide a run-time environment for executing the plurality of programs when a respective service receives the wireless message *without waiting for execution of the operations by the first processor*.

5. An IC Card according to claim 4, wherein said first memory is also configured to store an applet for associating the plurality of programs to respective services.

6. An IC Card according to claim 5, wherein said first processor and said first memory are configured to provide at least one application programming interface (API) for communication between the applet and said second processor and said second memory.

7. A method for executing a plurality of programs with an IC Card comprising a first device to communicate at least one mobile wireless communications device and a second device to communicate wireless communication with at least one other mobile wireless communications device, the second device providing services associated with the plurality of programs and to receive a wireless message from the at least one other mobile wireless communications device, the *second device also configured to execute an operation and to return a result to the at least one other mobile wireless communications device while waiting for execution of operations by the first device, the* method comprising:

executing the plurality of programs using a run-time environment of the second device after a corresponding service receives the wireless message *without waiting for execution of the operations by the first device*.

8. A method according to claim 7, wherein the plurality of programs are stored in a memory of the second device by an applet stored in a memory of the first device.

9. A method according to claim 8, wherein the plurality of programs are downloaded to a memory of the second device by a service for receiving the plurality of programs from the at least one other mobile wireless communications device.

10. A method according to claim 7, wherein the plurality of programs are associated with respective services by an applet.

11. A method according to claim 10 wherein the applet accesses an application programming interface (API) of the first device for communicating with the second device.

12. A method of operating an IC Card comprising:

communicating with a mobile wireless communications device using a first processor;

providing a plurality of services and wirelessly communicating with at least one other mobile wireless communications device using a second processor, a second memory, and a wireless transceiver cooperating together;

receiving a wireless message from the at least one other mobile wireless communications device, executing an [elaboration] *operation*, and returning an [elaboration] *operation* result to the at least one other mobile wireless communications device, using each service *while waiting for execution of operations by the first processor*;

storing and executing a plurality of programs for performing additional elaborations using the second memory and the second processor, each program being associated with a respective service; and providing a run-time environment for executing the plurality of programs when the respective services receive the wireless message using the second processor and the second memory *without waiting for execution of the operations by the first processor*.

13. A method according to claim 12, wherein a first memory is for storing an applet for associating the plurality of programs to respective services.

14. A method according to claim 13, further comprising providing at least one application programming interface (API) for communication between the applet and the second processor and the second memory using the first processor and the first memory.

*15. An IC device comprising:*

*a first processor and a first memory cooperating therewith and configured to communicate with a mobile wireless communications device;*

*a second processor, a second memory, and a wireless transceiver cooperating together and configured to provide a plurality of services and for wireless communication with at least one other mobile wireless communications device;*

*each service configured to receive a wireless message from said at least one other mobile wireless communications device, to execute an operation, and to return an operation result to said at least one other mobile wireless communications device while waiting for execution of operations by the first processor;*

*said second memory configured to store and said second processor configured to execute a plurality of additional programs for performing additional operations, each additional program being associated with a respective service;*

*said second processor and said second memory configured to provide a run-time environment for executing the plurality of programs when a respective service receives the wireless message without waiting for execution of the operations by the first processor.*

*16. An IC device according to claim 15, wherein said first memory is also configured to store an applet for associating the plurality of programs to respective services.*

*17. An IC device according to claim 16, wherein said first processor and said first memory are configured to provide at least one application programming interface (API) for communication between the applet and said second processor and said second memory.*

*18. A method of operating an IC device comprising:*

*communicating with a mobile wireless communications device using a first processor;*

*providing a plurality of services and wirelessly communicating with at least one other mobile wireless communications device using a second processor, a second memory, and a wireless transceiver cooperating together;*

*receiving a wireless message from the at least one other mobile wireless communications device, executing an operation, and returning an operation result to the at least one other mobile wireless communications device, using each service while waiting for execution of operations by the first processor;*

*storing and executing a plurality of programs for performing additional operations using the second memory and the second processor, each program being associated with a respective service;*

*and providing a run-time environment for executing the plurality of programs when the respective services receive the wireless message using the second processor and the second memory without waiting for execution of the operations by the first processor.*

*19. A method according to claim 18, wherein a first memory is for storing an applet for associating the plurality of programs to respective services.*

*20. A method according to claim 19, further comprising providing at least one application programming interface (API) for communication between the applet and the second processor and the second memory using the first processor and the first memory.*

* * * * *

UNITED STATES PATENT AND TRADEMARK OFFICE

CERTIFICATE OF CORRECTION

PATENT NO. : RE45,769 E
APPLICATION NO. : 14/222900
DATED : October 20, 2015
INVENTOR(S) : Francesco Varone and Amedeo Veneroso It is certified that error appears in the above-identified patent and that said Letters Patent is hereby corrected as shown below:

In the claims

| | |
|---|---|
| Column 9, Line 21, | Delete: "elaborations" |
| Claim 12 | Insert --[elaborations] *operations*-- |

Signed and Sealed this
Eighth Day of March, 2016

Michelle K. Lee

Michelle K. Lee
*Director of the United States Patent and Trademark Office*